United States Patent [19]

Tamoto

[11] Patent Number: 4,823,247
[45] Date of Patent: Apr. 18, 1989

[54] STABILIZED POWER SUPPLY UNIT
[75] Inventor: Sadaharu Tamoto, Kawasaki, Japan
[73] Assignee: Yutaka Electric Mfg. Co., Ltd., Japan
[21] Appl. No.: 150,374
[22] Filed: Jan. 29, 1988
[30] Foreign Application Priority Data Jun. 26, 1987 [JP] Japan .............................. 62-159393

[51] Int. Cl.$^4$ .......................................... H02M 3/335
[52] U.S. Cl. ........................................ 363/16; 363/56; 363/124; 323/224; 323/266
[58] Field of Search ................ 363/16, 17, 98, 124, 363/132, 56, 63; 323/222, 224, 266, 268, 271, 272; 307/44, 48, 66, 85–87

[56] References Cited

U.S. PATENT DOCUMENTS

| | | | |
|---|---|---|---|
| 3,696,286 | 10/1972 | Ule | 323/222 |
| 3,913,000 | 10/1975 | Cardwell, Jr. | 323/222 |
| 4,405,893 | 9/1983 | Rance | 323/271 |
| 4,481,460 | 11/1984 | Kroning et al. | 323/266 |
| 4,533,986 | 8/1985 | Jones | 363/17 |
| 4,542,451 | 9/1985 | Hucker | 323/222 |

OTHER PUBLICATIONS

OHM '84/12; SSN 0386-5576, pp. 22-32.
Applied Technology of Power Electronics for Saving Electric Power, ©1981, Denkishoin, The Status Quo of CVCF Apparatus, pp. 288-298.

Primary Examiner—Peter S. Wong
Attorney, Agent, or Firm—Lowe, Price, LeBlanc, Becker & Shur

[57] ABSTRACT

A stabilized power supply unit designed to supply the power from the commercial power source as far as the commercial power source is normal but supply the power from a battery that can be made available by an automatic switching device when the commercial power source has failed, wherein the AC voltage from the commercial power source is rectified by a rectification circuit to obtain almost equal DC currents on both the positive and negative sides of the common line while the commercial power source is normal. Said DC voltage is chopped by the boosting chopper circuit to boost the voltage on both the positive and negative sides. The boosted voltage is converted into the AC voltage through the DC-AC inverter, and the high-frequency component of the AC voltage is compressed through the filter in order to be outputted as an AC voltage of specified frequency. When the AC voltage is not inputted due to the failure of the commercial power source, the DC voltage from the battery is applied to the DC-AC inverter in order to be converted into the AC current and outputted as the specified AC voltage through the filter. In this manner, the direct transmission circuit with a common line can be formed without including an isolation device.

4 Claims, 3 Drawing Sheets

STABILIZED POWER SUPPLY UNIT

BACKGROUND OF THE INVENTION (1) Field of the Invention

The present invention relates to a stabilized power supply unit that is designed to supply the power from the commercial power source in the normal condition but supply the power automatically from the battery when the commercial power source has failed so that the stable power can be supplied without interruption at all times.

(2) Description of the Prior Art

FIG. 5 shows the case where the voltage of the commercial power source 1a is dropped to the specified voltage by transformer 1 installed on a utility pole, added to full-wave rectification circuit 4 through AC input terminals 2 and 3 for being rectified by said full-wave rectification circuit 4, smoothed by capacitor 5 and inputted to DC-AC inverter 6. The DC-AC inverter 6 serves to convert the DC voltage into AC voltage and obtain the predetermined AC voltage between the AC output terminals 8 and 9 through the isolation transformer 7 for the supply to the load.

When the commercial power source has failed due to an accident and the like, this is detected by a detector (not shown) to cause switch 10 to close, and battery 11 supplies the power to the DC-AC inverter 6 so that the AC output can be obtained without any interruption.

When the DC-AC inverter has got out of order to cause the rapid variation of the output voltage or to cause an excessive load current to flow through the load connected to both the AC output terminals 8 and 9, this is detected by output voltage detection circuit 12 or load current detection circuit 13, and change-over switch 14 is switched directly to line 15 on the AC input terminal 2 to prevent the supply of the power from being interrupted.

As described in the foregoing, in the case of what is called the direct-supply circuit designed for the direct supply of the AC input voltage through the AC input terminal 2 connected directly to the load, it is necessary for the side of the AC input terminal 3 to be connected to the AC output terminal 9 through common line 16. If these AC input terminals 8 and 9 are not connected to each other through the common line 16, the potential difference will occur between the terminals 8 and 9 when, for example, an impedance element is inserted in between, and this makes the grounding unstable.

In connecting the AC input terminals 8 and 9 to each other through a common line 16 in the manner common to the conventional circuit, however, there has been the problem such that the isolation device such as the transformer 7 has to be interposed between the AC input sides 2 and 3 and the output side of DC-AC inverter 6 in consideration of the relation with the internal potential. Thus, an object of the present invention is to provide a power supply unit capable of composing a direct-supply circuit not requiring the isolation means such as the transformer. Another object of the present invention is to provide a power supply unit featuring the reduced number of parts, compactness, lightweight, lower price and higher reliability. The further objects of and the features of the present invention will be clarified through the explanations in the following.

BRIEF SUMMARY OF THE INVENTION

A power supply unit comprising a rectification circuit for converting the AC input power into DC power, a DC-AC inverter for reconverting the DC power into AC power, a battery for inputting its DC power to said DC-AC power inverter when the supply of AC power input is interrupted and a direct power supply circuit interposed between one of the input terminals of said AC input side and one of the output terminals of said AC output side through the change-over circuit, featuring the other one of the terminals of said AC input side and the other one of the teminals of said AC output side connected to each other through a common line, a rectification circuit of said AC input consisting of a circuit to enable the positive side and the negative side of said common line to produce almost equal DC voltages, a boosting chopper interposed between this rectification circuit and said DC-AC inverter with respect to the positive and negative sides of said common line, said DC-AC inverter consisting of a pair of switching elements taking the form of a half-bridge type circuit that is capable of supplying almost equal voltages to said common line.

In the stabilized power supply unit of the above-described composition, the AC voltage is inputted from the commercial power source as far as the commercial power source is normal, and the inputted AC voltage is rectified by the rectification circuit to provide almost equal DC voltages to both the positive and negative sides with respect to the common line. The DC voltage is chopped by the boosting chopper circuit to boost the voltages at the positive and negative sides. The boosted voltage is converted into the AC voltage by the DC-AC inverter, and the high-frequency component of the AC voltage is then compressed through the filter in order to be outputted as the AC voltage of predetermined frequency. When the AC voltage input is not available due to the failure of the commercial power source, the DC voltage from the battery is applied to the DC-AC inverter for conversion into AC voltage, and the AC voltage is outputted at the predetermined voltage through the filter. In this manner, the direct supply circuit with a common line can be composed without using the isolation device.

DETAILED DESCRIPTION

Figure 5:
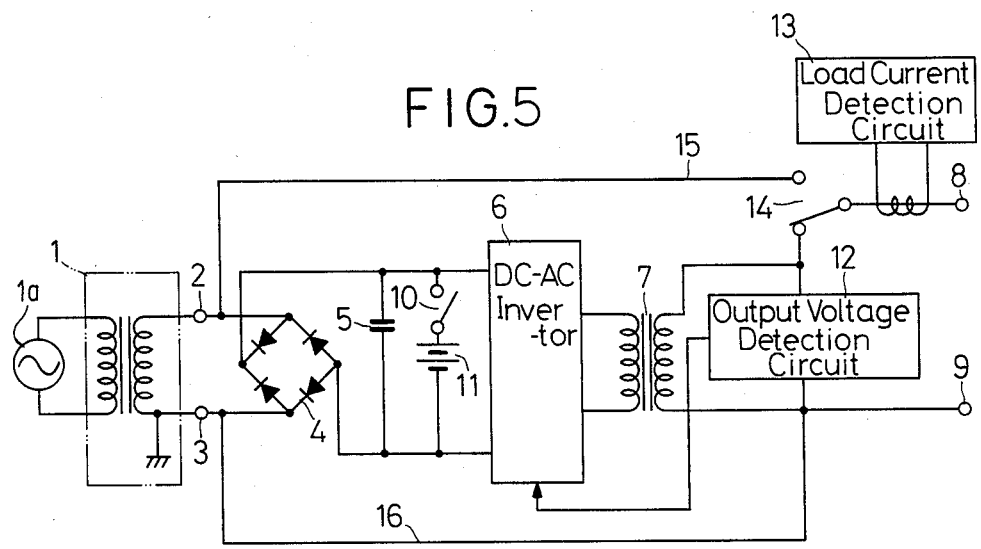
FIG. 5 is the electric circuit diagram of the conventional power supply unit.

The first embodiment of the present invention will be explained in the following in reference to FIG. 1. In this explanation, the same code numbers as those used in FIG. 5 will be used for the parts which are common to those shown in FIG. 5. The AC input terminals of the commercial power source 1a are denoted by the code numbers 2 and 3 respectively, and the stabilized AC output terminals by the code numbers 8 and 9 respectively. Of these input terminals and output terminals, one of the AC input terminals 2 and one of the AC output terminals 8 are connected to each other through the change-over circuit 14, whereas the other one of the AC input terminals 3 and the other one of the AC output terminals 9 are directly connected with the common line 16 to form the direct supply circuit.

Voltage-multiplication-rectification-smoothing circuits 21 and 22 on the positive side and negative side consisting of rectification elements 17 and 18 and capacitors 19 and 20 are connected between said AC input terminals 2 and 3. In the stage following these voltage-multiplication-rectification-smoothing circuits 21 and 22, reactors 23 and 24, transistors 25 and 26 as switching elements and boosting chopper circuits 31 and 32 consisting of rectification elements 27 and 28 and capacitors 29 and 30 are connected to the positive side and negative side with respect to said common line 16. Further, in the stage following said stage, there is connected a half-bridge type DC-AC inverter consisting of transistors 33 and 34 as switching elements, reactor 35 and capacitor 36. The reactor 35 and the capacitor 36 of said DC-AC inverter constitute a filter to compress the higher harmonic component of the AC voltage produced.

The preceding stage of said boosting chopper circuits 31 and 32 is connected to the batteries 38a and 38b through reverse-current prevention diodes 39 and 40.

The bases of the transistors 25 and 26 of said boosting chopper circuits 31 and 32 are connected to drive circuits 41 and 42 which open and close with higher harmonic of over 20 kHz, and said drive circuits 41 and 42 are connected to voltage detection circuits 43 and 44 which are connected to both ends of said capacitors 29 and 30.

The bases of the transistors 33 and 34 of said DC-AC inverter 37 are connected to pulse width modulation circuit 45 that opens and closes at over 20 kHz and performs the pulse modulation corresponding to the waveform of the AC input voltage.

The change-over circuit 14 of said direct supply circuit is connected to load current detection circuit 13 or output voltage detection circuit 12.

The actions taking place in the circuit of the above-described composition will be explained in the following.

Figure 2:
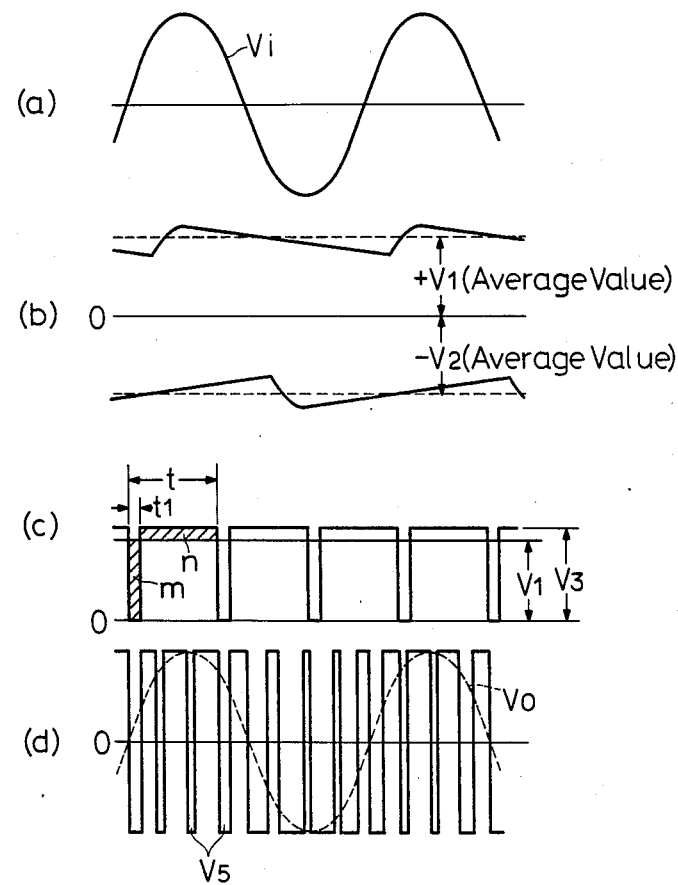
FIG. 2 is a diagram showing the waveforms of various parts of the unit shown in FIG. 1.

When the AC voltage Vi as is shown in FIG. 2(a) is applied across the AC input terminals 2 and 3, for the voltage-multiplication-rectification-smoothing circuits 21 and 22, the DC voltages $+V_1$ and $-V_2$ which are equal on both positive side and negative side can be obtained with respect to the common line 16 as shown in FIG. 2(b). These DC voltages, $+V_1$ and $-V_2$ are boosted by the boosting chopper circuits 31 and 32. In this case, as shown in FIG. 2(c), the voltages $+V_3$ and $-V_4$ which are higher than the DC voltaged $V_2$ and $-V_3$ can be obtained at both ends of the capacitors 29 and 30 due to the open and close actions of the transistors 25 and 26. In this FIG. 2(c), period $t = 1/f$ ($=20$ kHz or more). Where the ON-time of the transistor 25 is given as $t_1$, the areas m and n marked with slant lines are equal to each other. In other words, the increases in the voltages $+V_3$ and $-V_4$ are detected by the detection circuits 43 and 44 respectively to reduce the ON-time $t_1$ of the transistors 25 and 26 by the drive circuits 41 and 42, whereas the ON-time $t_1$ is increased when the voltages $+V_3$ and $V_4$ decrease. The pulse voltage shown in FIG. 2(c) is smoothed by the rectification elements 27 and 28 and the capacitors 29 and 30 for transmission to the DC-AC inverter 37. The transistors 33 and 34 of said DC-AC inverter 37 become ON and OFF alternately, and the ON-time and OFF-time correspond the AC input waveform respectively to generate the pulse voltage waveform $V_5$ as indicated with the solid line in FIG. 2(d). This pulse voltage $V_5$ is used to compress the higher harmonic component in the reactor 35 and the capacitor 36 to produce the AC output voltage $V_o$ as is indicated with the dotted line in FIG. 2(d). When the AC input is interrupted due to the power source failure, the DC power is supplied to the boosting chopper circuits 31 and 32 respectively to obtain the AC output $V_o$ in the similar manner. When the DC output voltages of the batteries 38a and 38b are set to the values which are slightly lower than the voltages shown in FIG. 2(b), the device equivalent to the change-over switch 14 shown in FIG. 5 need not be interposed.

Also, when the DC-AC inverter 37 gest out of order, or when the excessive load current flows, such current is detected by the load current detection circuit 13 and the output voltage detection circuit 12 respectively, and the current is supplied directly to the load from the AC input terminal 2 by way of the change-over circuit which serves as the direct supply circuit. In this case, the other input and output terminals 3′ and 9 are connected with the common line 16, and so there is no problem.

Figure 1:
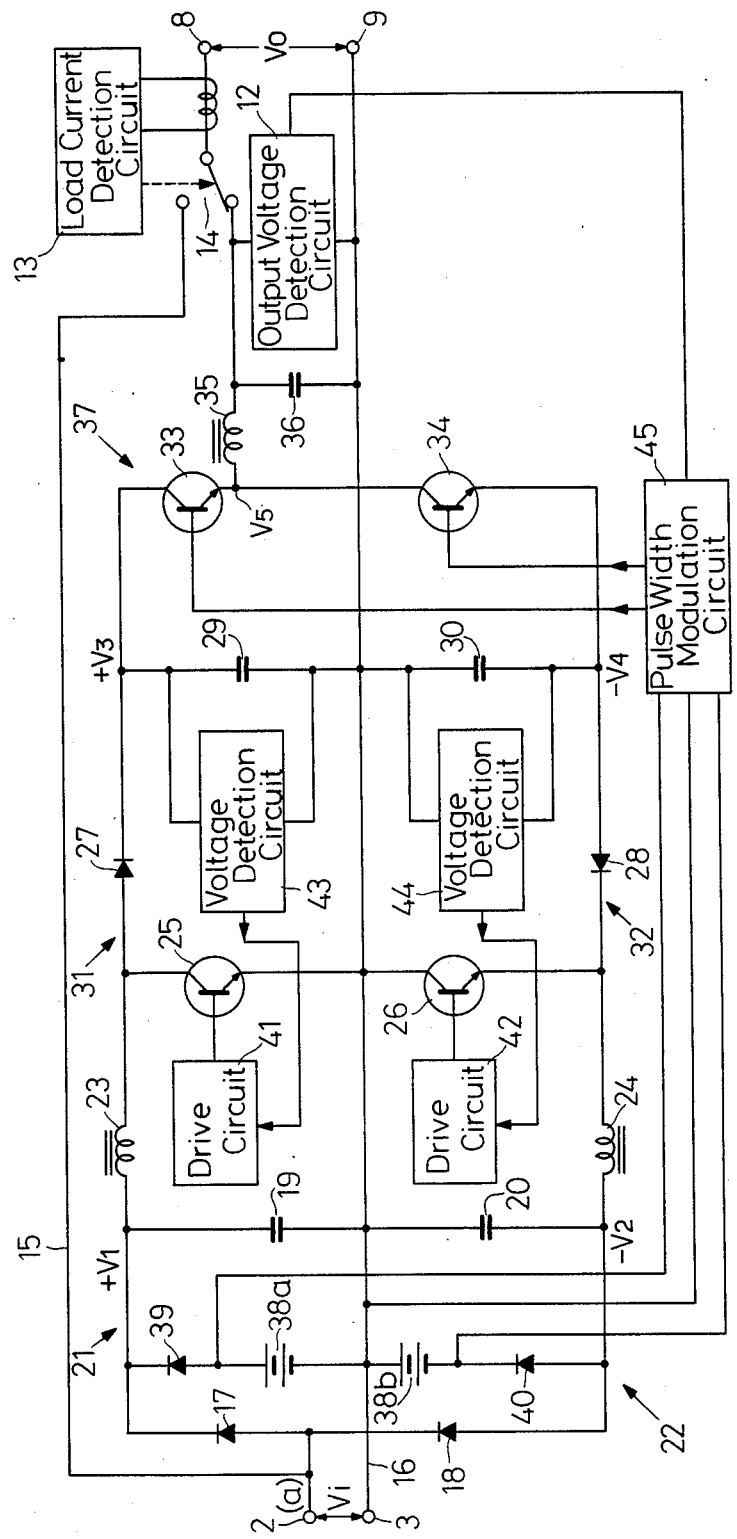
FIG. 1 is an electric circuit diagram showing the first embodiment of the present invention relating to a stabilized power supply unit.
Figure 3:
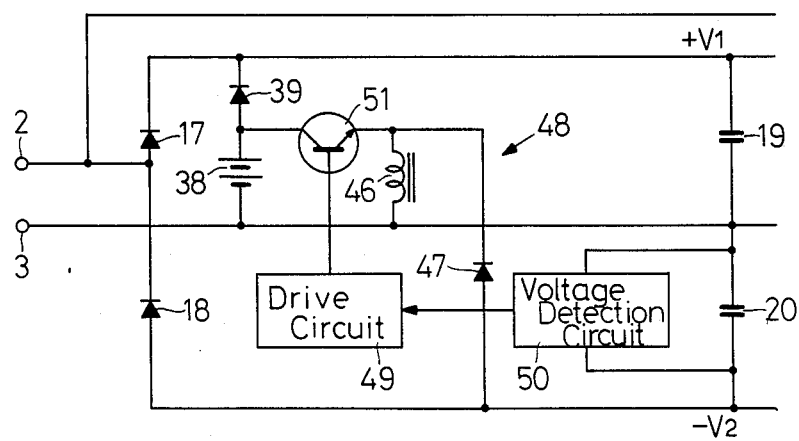
FIG. 3 is an electric circuit diagram of another embodiment of the present invention.

In the case of the embodiment described in FIG. 1, the two batteries 38a and 38b, one for each of positive side and negative side, are interposed with respect to the common line 16, but, as shown in FIG. 3, the number of the batteries can be reduced to one battery 38 by interposing a reverse chopper circuit 48 consisting of the transistor 51, reactor 46 and diode 47. Besides, the base of said transistor 51 is connected to the drive circuit 49 to control ON and OFF of the transistor, and said drive circuit 49 is connected to the voltage detection circuit 50 that is connected to both ends of the capacitor 20.

Figure 4:
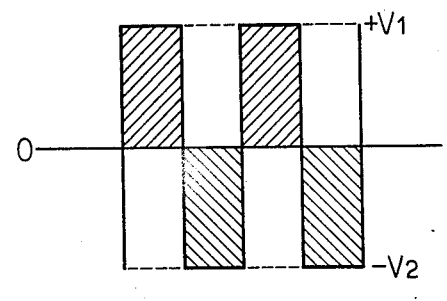
FIG. 4 is the output waveform diagram concerning the electric circuit shown in FIG. 3.

In the circuit of the above-described composition, as shown in FIG. 4, the voltage $+V_1$ is applied to the both ends of the reactor when the transistor 51 is ON, and the voltage $-V_2$ is applied to the both ends of the capacitor 20 when the transistor 45 is OFF. The actions taking place in the circuits following are the same as those described in the foregoing.

In the above mentioned, the transistors are used as the switching elements 25, 26, 33, 34 and 51, but they can be replaced with MOSFET.

What is claimed is:

1. A stabilized AC power supply comprising:
   rectification circuit means for converting AC input from AC supply terminals into direct current (DC);
   DC-AC inverter means;
   DC power source means for inputting DC power to said DC-AC inverter means to obtain AC output at AC output terminals when said AC input is interrupted;
   a first direct AC supply circuit connecting a first of said AC supply terminals to a first of said AC output terminals through change-over switch means;
   a second direct AC supply circuit connecting a second of said AC supply terminals and a second of said AC output terminals through a common connection.
   said rectification circuit means providing from said AC input almost equal DC voltages of positive and negative polarities relative to said common connection;

boosting chopper circuit means connected between said rectification circuit means and said DC-AC inverter means for both said positive and negative polarities with respect to said common connection;

said DC-AC inverter means including a pair of switching means providing half-bridge type circuit means capable of supplying almost equal voltages of opposite polarity with respect to said common connection.

2. A stabilized power supply according to claim 1, wherein the DC power source means comprises separate batteries for the positive and negative polarities with respect to said common connection.

3. A stabilized power supply according to claim 1, wherein said DC power source means comprises a battery providing one polarity with respect to said common connection, and reverse chopper means providing the opposite polarity with respect to said common connection.

4. A stabilized power supply according to claim 1, wherein the boosting chopper circuit means comprises reactance means, rectifier means and capacitor means connected in series across said DC voltages of positive and negative polarities provided by said rectification circuit means, and switching means connected between said rectifier means and said common connection.

* * * * *